Patented Nov. 28, 1950

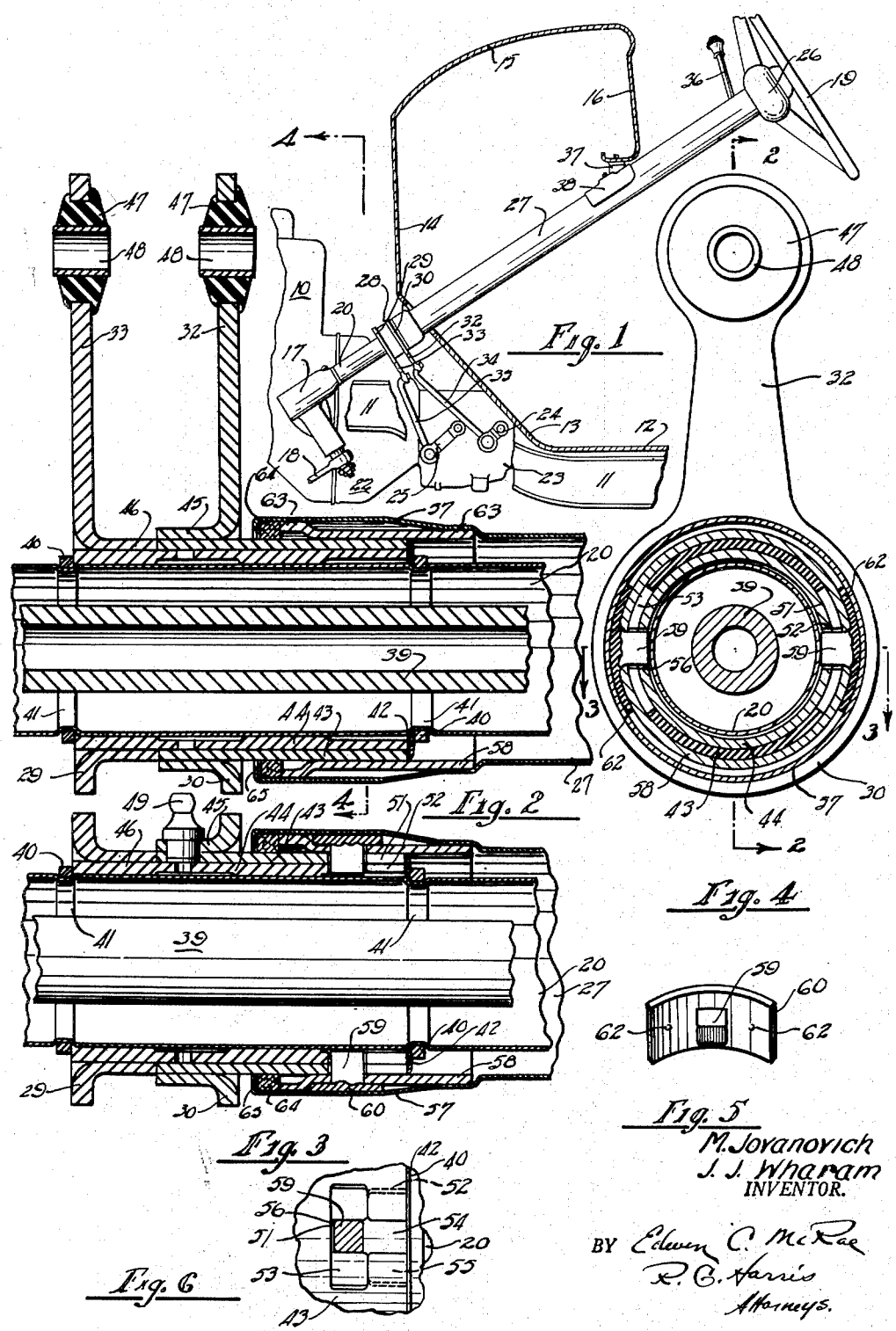

2,532,170

UNITED STATES PATENT OFFICE 2,532,170

STEERING COLUMN GEARSHIFT CLUTCH CONSTRUCTION

Milton Jovanovich, Detroit, and John J. Wharam, Dearborn, Mich., assignors to Ford Motor Company, Dearborn, Mich., a corporation of Delaware Application October 19, 1945, Serial No. 623,247

12 Claims. (Cl. 74—484)

This invention relates to the construction on steering column gearshift control for automotive vehicles; and, more particularly, to a type of control in which the shifting shaft is in the form of a tube arranged concentrically exteriorly of the steering column of the vehicle and is specifically directed to the clutch construction employed in connection with the shifting shaft to transmit its movement to the transmission.

Attention is first directed to the copending application filed this day for a Concentric Steering Column Gearshift in which the advantages of this type of construction are fully outlined, and the entire assembly, as applied to a motor vehicle, is shown in full. The present application is directed specifically to the clutch mechanism for the control: that is, the lower end construction including the column levers which are operated by the reciprocation and rotation of the shifting shaft to move the transmission operating levers and effect the selection between the various speed ratios. The construction of the transmission itself forms no part of this invention, since it follows the usual design, and the other elements making up the complete gearshifting device are more fully described in the application first referred to, and in the other applications filed herewith directed to a Concentric Steering Column Gearshift Operating Mechanism and a Concentric Steering Column Gearshift Support Construction.

While the general advantage of this type of steering column gearshift is described at length in the principal application, the structure has particular merit so far as the clutching device which may be incorporated in it is concerned. By the phrase "clutching device," reference is made to the selective mechanism placed on the lower end of the steering column which translates the reciprocation and rotation of the operating shaft in response to movements of the operating lever into reciprocation applied to two or more links leading to the transmission proper. These links, in turn, are connected to suitable shifting forks within the transmission and are controlled by an interlocking device in the transmission to effect the desired selection of speed ratios. In the usual auxiliary shaft type steering column gearshift, the auxiliary shifting shaft is mounted on top of the steering column proper and the clutch mechanism at its lower end is similarly supported. As the clutch mechanism is positioned within the engine compartment and beneath the toeboard of the vehicle, there is no problem of decorative treatment. However, the shifting shaft is usually relatively small in diameter—from 5/8" to an inch—and it is desirable to keep the clutch mechanism as near to the same range of dimensions as possible to save the space at that point. This requires that the clutching mechanism be quite small—in so far as its engaging elements are concerned—since if it is much larger, the auxiliary shaft must be set at an angle to the steering column or, if kept parallel, must be spaced a considerable distance from it to permit the inclusion of the clutch element. Another disadvantage is that the clutch must be supported upon the steering column and it is the usual practice to put this either on the top or the side of the column. This requires brackets and places the clutch mechanism in a position which can be easily damaged since it is entirely exposed. Still another disadvantage of that type of clutch mechanism is that it is difficult to supply an adequate bearing for the clutch members and as a result they become noisy in use and vibration from them is directly transmitted to the interior of the car through the auxiliary shaft.

The advantage of the present construction is that since the shifting shaft is mounted concentrically of the steering column, the clutching element can be made of considerably larger size, as there is no problem of alignment of the auxiliary shaft. In addition, since they are mounted concentrically on the steering column, no brackets are required and they are firmly and completely supported there and an adequate bearing is provided under all circumstances. Still another advantage is that instead of having a separate unit as a clutch mounted on top of the steering column, the clutch is, in a manner of speaking, integral with the column and fully protected against derangement by anyone working within the engine compartment.

Apart from these advantages springing from the general type of gearshift design, the present structure possesses several of its own. In the first place, it may be made entirely of stampings without any diminution in strength, and the greater part of these stampings are initially fabricated from standard sections. This is a considerable item so far as expense is concerned and is in direct contrast with the usual type of clutching mechanism in which one or more forgings or castings are necessary because of the complex nature of the components. Another noteworthy advantage is the extent of bearings provided between the clutching elements which insures that they will not wear unduly under ordinary service nor become noisy or difficult to operate. Still another advantage is the ease with which the device may be assembled or disassembled for service and the simplicity of the various parts used. Still another advantage is the compactness of the clutching mechanism longitudinally of the shaft which permits the operative parts to be placed very close to the transmission, thus cutting down the length of the links necessary for operative attachment with that latter component.

Other advantages will be apparent from full description of the invention which is set forth in this specification, claimed in the following claims, and shown in the drawings in which:

Figure 1 is a longitudinal transverse section to the forward portion of a motor vehicle showing, generally, the relation of the various elements making up this invention.

Figure 2 is a substantially vertical longitudinal section taken through the clutching device at the lower end of the steering column substantially as indicated by the line 2—2 on Figure 4.

Figure 3 is a substantially horizontal longitudinal section taken through the clutching device as indicated by the line 3—3 of Figure 4.

Figure 4 is a transverse vertical section through the clutching device taken substantially as indicated by the line 4—4 of Figure 2.

Figure 5 is a perspective view of the pin member used in making up the clutch.

Figure 6 is a plan view corresponding to a portion of Figure 2 but with the shifting shaft and its lower reinforcing sleeve removed.

Referring first to Figure 1, 10 indicates the motor of an automobile having a frame 11 supporting the usual body, the only portions of which are shown being indicated by the section taken through the floor 12, toeboard 13, dashboard 14, cowl 15, and instrument panel 16. The usual steering gear 17 is fixedly secured to the frame 10 and has a steering arm 18 controlled by rotation of steering wheel 19, which is rotatably supported on the fixed steering column 20. The engine terminates in a clutch housing 22 and the transmission 23 selectively controlled by the two external transmission operating levers 24 and 25. One of these levers controls the selection as between reverse and low speed ratios and the other the selection between second and third. As is customary, an interlocking device is provided within the transmission so that but one of the ratios may be selected at any one time.

The steering wheel 19 has a hub 26 which encloses the upper end of the operating tube 27 rotatably and reciprocably mounted on the steering column 20 and terminating at its lower end in a clutching device 28, selectively operating one or the other of two collars 29 and 30, terminating in the arms 32 and 33 which are attached by the links 34 and 35 to the transmission operating levers 24 and 25. The operating lever 36 for the tube 27 is pivotally mounted on the steering column immediately beneath the hub 26 in a convenient position to be grasped by the driver of the motor vehicle. The steering column 20 is further supported intermediate the hub and the steering gear by a bracket 37 fixed to the instrument panel 16 and extending through a slot in the outer tube 27, the slot being covered by the skirt 38 which forms an integral part of the bracket.

Reference is now made to Figures 2, 3 and 4, showing in detail the construction of the clutching device 28 at the lower end of the steering column assembly. It will be noted that the steering column 20 encloses the steering shaft 39 and directly supports the entire clutch mechanism which is rotatably mounted on it but retained in place longitudinally by the snap rings 40 seated in the spaced circumferential indentations 41 and interposed spring washer 42. The clutching mechanism comprises two concentric sleeves 43 and 44, the inner sleeve 44 being rotatably mounted on the column 20 and the outer sleeve 43 being rotatably mounted on the exterior of the sleeve 44. The arms 32 and 33 have cylindrical flanges 45 and 46 which are slipped over the lower ends of the sleeves 43 and 44, respectively, and permanently secured to them. The upper end of the flange 46 serves as an abutment for the lower end of the sleeve 43 restraining its movement downwardly, and the lower snap ring 40 serves the same purpose for the lower end of the sleeve 44. Resilient mountings 47 carrying the bushings 48, are provided at the outer ends of each of the arms 32 and 33 for connection with the links 34 and 35; while a lubrication fitting 49 is provided to admit lubricant between the sleeves 43 and 44 and the inner sleeve 44 and the column 20. Each of the sleeves 43 and 44 is provided with a T slot 51 or 52. The head 53 of the T slot 51 in the outer sleeve 43 is located downwardly with respect to the column while its shank 54 extends upwardly and terminates at the upper edge of the sleeve 43. The T slot 52 in the inner sleeve 44 is precisely reversed having its head 55 beginning at the upper end of the sleeve 44 and its shank 56 extending downwardly with respect to the column 20 so that the shank 54 overlies the head 55 longitudinally and the shank 56 underlies the head 53 as will be apparent from Figure 6.

The mechanism to operate these sleeves is entirely enclosed within the lower end of the operating tube 27 which is flared as at 57 to receive it concentrically on the outer surface of the sleeve 43. This mechanism comprises a reinforcing sleeve 58 which may slide within the flared end 57 and to which are attached the diametrically disposed clutching pins 59 which extend inwardly of the inner surface of the sleeve 58 a sufficient distance to engage the T slots in the sleeves 43 and 44. As shown in Figure 5, the clutching pins 59 are formed integrally with a cylindrical backing member 60 having the welding lugs 62. The sleeve 58 is provided with a hole to receive the pin 59 and the inner curvature of the member 60 conforms to that of its outer surface. The pin 59 is then inserted through the sleeve 58 and spot welded to it in the usual manner making use of the lugs 62. The assembled sleeve 58 with the two pins 59 then slides within the flared end 57 and is spot-welded in place at points 63. The pins are then fixedly secured with respect to the tube 27 which has its entire lower end reinforced by the sleeve 58 and a rotatable and reciprocable bearing supplied for the lower end of the tube 27 on the outer surface of the sleeve 43. A lubricant retainer 64 is then slipped within the flared end 57 against the lower end of the sleeve 58 and the extreme lower end of the tube 27 is turned over as at 65 to complete the assembly.

The method of assembly of the tube and the associated sleeves is believed to be quite clear from the foregoing. The tube 27 is initially placed on the steering column and its upper end engaged in proper relationship with the operating lever 36 as illustrated in the copending applications. The upper snap ring 40 and spring washer 42 are then placed in the upper indentation 41 and the two sleeves are slipped upwardly along the column 20 with the shanks 54 and 56 in alignment with the pin 59 until they reach the position shown in Figure 3. The lower snap ring 40 may then be inserted and the assembled shaft placed in the vehicle and connected to the steering gear 17. As shown in applicants' Patents 2,455,179 and 2,455,204, a spring may be provided at the upper operating end of the device between the tube 27 and the column 20 normally urging the tube to its lower position—that is, with the pin 59 in the shank 56 and aligned with the head 53 so that on rotation of the tube 27, the sleeve 44 will be rotated in the same sense as the operating lever 36, while the position of the outer sleeve 43 is not changed. However, when the operating lever 36 is lifted, the pin 59 will move upwardly in response to the corresponding movement of the tube 27 so that on subsequent rotation of the lever 36, the outer sleeve 43 will be rotated in response to rotation of the operating lever 36 while the inner sleeve will remain in the neutral position. Of course, when the pin is in either of the upper rotated positions, it is held against downward movement by the lower edge of the head 55. It will be understood that when the shanks 54 and 56 are aligned, the transmission is in the neutral or crossover position and it is only when it is rotated either clockwise or counterclockwise in either the upper or lower position that selection of one of the gear ratios is accomplished.

The advantages of the above construction are believed to be quite clear in consideration of its structure and operation. The device is remarkably compact and well supported and yet sufficiently large to provide for adequate engaging surfaces for the clutching pins and bearing surfaces for the several members which are movably mounted with respect to each other. The clutching sleeves are rotatably supported on the steering column and on each other and fully restrained against longitudinal movement. The lower end of the operating tube 27 is provided with an adequate bearing permitting its free reciprocation and rotation on the sleeves and, through them, on the column. The tube is thus kept in its proper centered position and is restrained against rattling or the transmission of noise. The pin structure is particularly sturdy and the subassembly of the pin structure and reinforcing sleeve not only provides for the requisite transfer of operating torque from the tube 27, but also reinforces the lower end of that tube and provides a bearing for it. The method of mounting permits the easy assembly of the device as well as its disassembly for service purposes. Stampings are used throughout with an attendant saving in cost and the components are secured together through easily applied spot welds. In operation, the device is remarkably smooth and easy—and, due particularly to the large bearing surfaces provided, this ease of operation does not decrease with continued use.

Another advantage accruing from the concentric arrangement of the sleeves 43 and 44 is that independent bearing surfaces are supplied for each sleeve—thus the inner sleeve 44 has its bearing on the outer surface of the steering column 20, while the outer sleeve 43 has its bearing exclusively on the outer surface of the sleeve 44.

It is a common experience that the sleeve controlling the second and third speed ratios is used much more than that for reverse and low speed and is more subject to wear. Where both sleeves are mounted on the same bearing surface, this difference in wear will, in time, lead to misalignment and noisy operation. Here this is avoided by providing independent bearing surfaces for each of the sleeves and by employing the inner sleeve 44 with its much larger bearing area for the second and third speed operation.

It is realized that certain changes may be made in the specific structure shown herein, but it is the intention to cover by the claims such of these changes as are reasonably within the scope thereof.

The invention claimed is:

1. In a clutching mechanism for a steering column gearshift, in combination, a steering column, a concentric operating tube reciprocably and rotatably mounted exteriorly of the steering column, a first sleeve rotatably mounted on said steering column, a second sleeve rotatably mounted on said first sleeve, said sleeves being secured against longitudinal movement on said column, extending arms secured to each of said sleeves, and co-operating clutching means on said sleeves and the lower end of said tube clutching said first sleeve to said tube for rotation therewith in one position of reciprocation of said tube and clutching said second sleeve to said tube for rotation therewith in another position of reciprocation of said tube.

2. In a clutching mechanism for a steering column gearshift, in combination, a steering column, a concentric operating tube reciprocably and rotatably mounted exteriorly of the steering column, a first sleeve rotatably mounted on said steering column, a second sleeve rotatably mounted on said first sleeve, said sleeves being secured against longitudinal movement on said column, radially extending arms secured to each of said sleeves, a T slot in each of said sleeves normally having their shanks longitudinally aligned and their heads oppositely disposed, a clutching pin secured to the lower end of said tube adapted to engage said T slot, clutching said first sleeve to said tube for rotation therewith in one position of reciprocation of said tube or clutching said second sleeve to said tube for rotation therewith in another position of reciprocation of said tube.

3. In a clutching mechanism for a steering column gearshift, in combination, a steering column, a concentric operating tube reciprocably and rotatably mounted exteriorly of the steering column, a first sleeve rotatably mounted on said steering column, a second sleeve rotatably mounted on said first sleeve, said sleeves being secured against longitudinal movement on said column, radially extending arms secured to each of said sleeves, T slots in each of said sleeves having their shanks aligned when in neutral position and their heads oppositely disposed, a pin secured on and adjacent the lower end of said tube and slidable longitudinally in the aligned shanks of said T slots when said tube is in neutral position, said pin clutching said first sleeve to said tube for rotation therewith when in one position of reciprocation of said tube and clutching said second sleeve to said tube for rotation therewith in another position of reciprocation of said tube, said second or said first sleeve, respectively, then remaining in the neutral position.

4. In a clutching mechanism for a steering column gearshift, in combination, a steering column, a concentric operating tube reciprocably and rotatably mounted exteriorly of the steering column, a pair of spaced circumferential indentations on said steering column adjacent the lower end thereof, retaining means in said indentations, a first sleeve slidable and rotatable upon said steering column and retained against longitudinal movement thereof by said retaining means, said first sleeve having a flange thereon, a second sleeve slidably and rotatably mounted on said first sleeve and retained against longitudinal movement with respect to the tube between the flange on said first sleeve and one of said retaining means, T slots in each of said sleeves having their shanks aligned longitudinally of said steering column when said sleeves are in neutral position and having their heads oppositely disposed transversely of said steering column, and pin means carried on said tube aligned with said shanks when said tube is in neutral position and adapted to clutch said first sleeve for rotation therewith when in one position of reciprocation of said tube and to clutch said second sleeve to said tube for rotation therewith in another position of reciprocation of said tube, said second or first sleeve, respectively, then remaining in neutral position.

5. The structure of claim 4 which is further characterized in that a member having a reciprocable and rotatable bearing surface is supported upon the lower end of said tube for cooperation with the outer surface of said second sleeve.

6. The structure of claim 4 which is further characterized in that the lower end of said tube is radially flared, a reinforcing sleeve within the flared portion of said tube, the inner surface of said reinforcing sleeve having rotatable and reciprocable bearing on the outer surface of said second sleeve, said reinforcing sleeve being permanently secured to said tube, and said pin being permanently secured to said reinforcing sleeve.

7. The structure of claim 4 which is further characterized in that the lower end of said tube receives a reinforcing sleeve having substantially greater wall thickness than said tube, said reinforcing sleeve being permanently secured to the lower end of said tube, a hole in said reinforcing sleeve, a pin structure comprising a cylindrical backing member and an inwardly extending pin integral therewith, said backing member being disposed on the outer surface of said reinforcing sleeve and said pin extending through said hole therein, the inner surface of said reinforcing sleeve having reciprocable and rotatable bearing on said outer sleeve.

8. The structure of claim 4 which is further characterized in that said sleeves are resiliently restrained against longitudinal movement on said colunm.

9. The structure of claim 4 which is further characterized in that the lower end of said operating tube is flared outwardly successively for at least two reaches of successively larger diameter, a reinforcing sleeve having an inner diameter through the greater portion of its longitudinal extent to provide a reciprocable and rotatable bearing on said second sleeve and having its outer diameter conforming to said first flared portion of said tube, a hole in said reinforcing sleeve, a pin structure comprising a cylindrical backing member having curvature conforming to the outer surface of said reinforcing sleeve and a pin extending radially inwardly therefrom, said pin extending through said hole and said backing member being seated on the outer surface of said reinforcing sleeve, the outer surface of said backing member having a diameter conforming to the outer diameter of the remainder of said reinforcing sleeve and to the inner diameter of said second flared portion of said tube, said assembled reinforcing sleeve and said pin structure being slidably received within said flared portion to admit of permanent attaching by welding thereto in each of said separate flared areas.

10. In a pin structure for a clutch having an operating tube, in combination, concentrically arranged cylindrical co-operating clutching members, a clutching pin structure comprising a cylindrical backing member conforming internally to the outermost of said clutching members, a pin integrally formed on said backing member and extending radially inwardly thereof, and projecting welding lugs on the inner surface of said backing member to facilitate welding of said pin structure to said operating tube.

11. In a clutching mechanism for a steering column gearshift, in combination, a steering column, a concentric operating tube reciprocably and rotatably mounted exteriorly of the steering column, a pair of concentric sleeves rotatably mounted coaxially with said steering column and held against longitudinal movement, arms extending from each of said sleeves and co-operating clutching means on said sleeves and the lower end of said tube, clutching one of said sleeves to said tube for rotation therewith in one position of reciprocation of said tube and clutching the other of said sleeves to said tube for rotation therewith in another position of reciprocation of said tube.

12. In a clutching mechanism for a steering column gearshift, in combination, a steering column, a concentric operating tube reciprocably and rotatably mounted exteriorly of the steering column, a pair of concentric sleeves rotatably mounted coaxially with said steering column and held against longitudinal movement, arms extending from each of said sleeves, a generally T-shaped slot in each of said sleeves, said slots normally having their shanks longitudinally aligned and their heads oppositely disposed, a clutching member carried at the lower end of said tube adapted to engage said T-shaped slots and clutching one of said sleeves to said tube for rotation therewith in one position of reciprocation of said tube or clutching the other of said sleeves to said tube for rotation therewith in another position of reciprocation of said tube.

MILTON JOVANOVICH.
JOHN J. WHARAM.

REFERENCES CITED

The following references are of record in the file of this patent:

UNITED STATES PATENTS

| Number | Name | Date |
| --- | --- | --- |
| 1,986,860 | Snow | Jan. 8, 1935 |
| 2,097,566 | Hummer | Nov. 2, 1937 |
| 2,231,742 | Witzke | Feb. 11, 1941 |
| 2,280,047 | Nampa | Apr. 14, 1942 |
| 2,317,654 | Wharam | Apr. 27, 1943 |
| 2,455,179 | Jovanovich | Nov. 30, 1948 |